June 17, 1952  W. L. MORRISON, JR., ET AL  2,600,795
MAGNETIC POWER UNIT REVERSING DRIVE
Filed Sept. 28, 1949  3 Sheets-Sheet 1
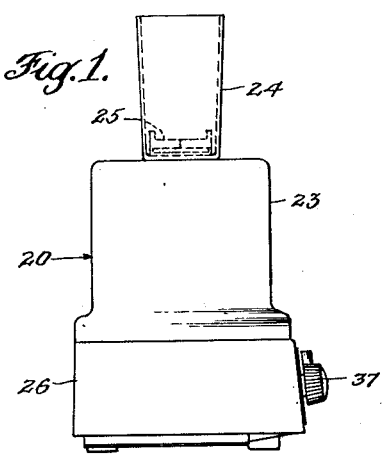
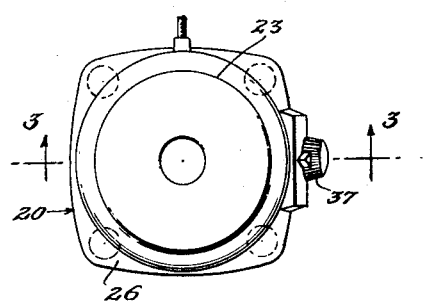
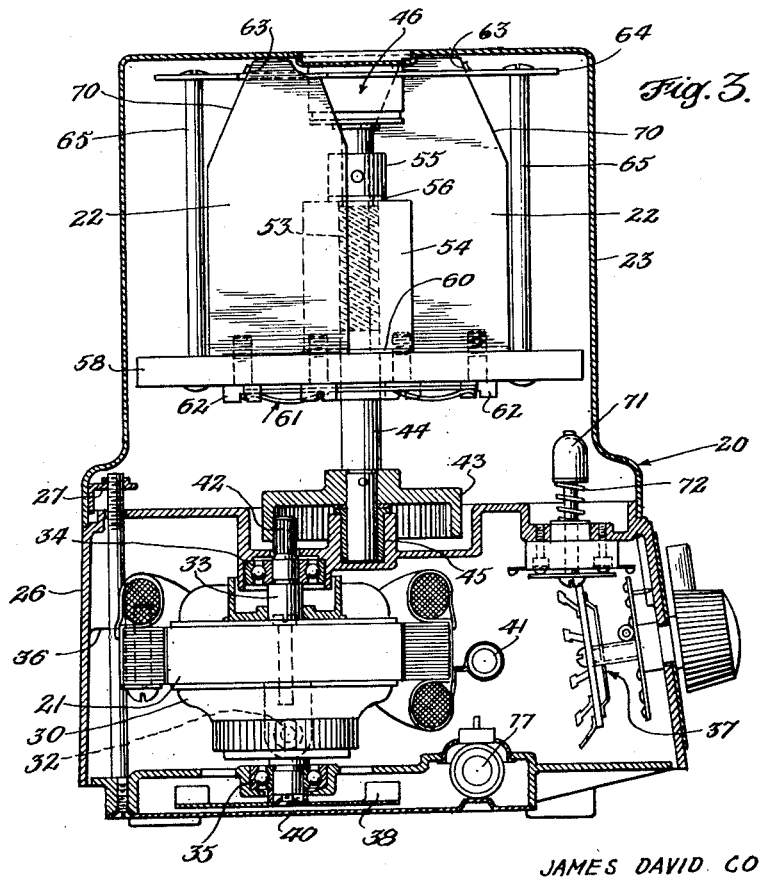
Inventors
JAMES DAVID COLE
AND WILLARD L. MORRISON JR.
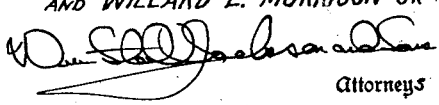
Attorneys Inventors
JAMES DAVID COLE
AND WILLARD L. MORRISON JR.
By
Attorneys June 17, 1952   W. L. MORRISON, JR., ET AL   2,600,795
MAGNETIC POWER UNIT REVERSING DRIVE
Filed Sept. 28, 1949   3 Sheets-Sheet 3

INVENTORS
JAMES DAVID COLE
AND WILLARD L. MORRISON JR.
BY
ATTORNEYS

Patented June 17, 1952

2,600,795

UNITED STATES PATENT OFFICE 2,600,795

MAGNETIC POWER UNIT REVERSING DRIVE

Willard L. Morrison, Jr., Akron, and James David Cole, Kent, Ohio, assignors to Magnetic Power, Inc., Wilmington, Del., a corporation of Delaware Application September 28, 1949, Serial No. 118,305

10 Claims. (Cl. 172—284)

The present invention relates to magnetic power units of the type in which a turning permanent magnet drives a magnetizable keeper to accomplish some mechanical operation such as mixing, stirring, homogenizing, juicing of fruit, or operation of some piece of equipment.

A purpose of the invention is to facilitate removal of the work from a magnetic power unit by causing the permanent magnet to move away from the work automatically.

A further purpose is to move the permanent magnet axially of the driving shaft by threaded interconnection between the driving shaft and the permanent magnet and to reverse the direction of driving of the shaft and thus move the permanent magnet away from the work at the termination of a cycle of operation.

A further purpose is to support a permanent magnet in a rotor provided with an axial nut interthreading with a threaded shaft, and to change the direction of driving of the shaft at the end of a cycle of operation to move the permanent magnet to a position remote from the work.

A further purpose is to reverse the driving motor in a magnetic power unit of the character described at the end of a cycle of operation and preferably also to cut off the motor by a limit switch when the permanent magnet has moved to the desired remote position.

A further purpose is to apply a drag to the permanent magnet or its rotor from the casing at a position removed from the axis at the beginning of the cycle of operation.

A further purpose is to cause the rotor to contact a spring directed parallel to the axis at the end of the cycle of operation, and preferably upwardly directed.

Further purposes appear in the specification and in the claims.

In the drawings we have chosen to illustrate one only of the numerous embodiments in which our invention may appear, selecting the form shown from the standpoints of convenience in illustration, satisfactory operation and clear demonstration of the principles involved.

Figure 1 is a side elevation of a magnetic power unit in accordance with the invention accomplishing mixing in a glass.

Figure 2 is a top plan view of the power unit of Figure 1 removing the glass and magnet keeper.

Figure 3 is a section of Figure 2 on the line 3—3.

Figure 4 is a view similar to Figure 3 showing the rotor in section and the lower housing in elevation, whereas Figure 3 shows the rotor in elevation and the lower housing and motor in section.

In the drawings like numerals refer to like parts.

Figure 4:
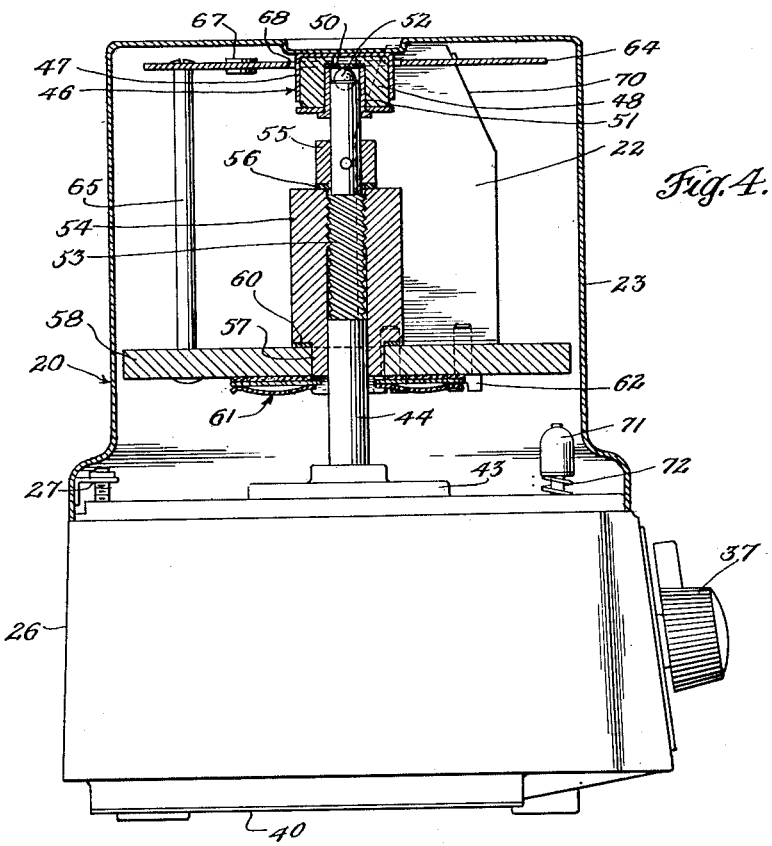
Figure 5:
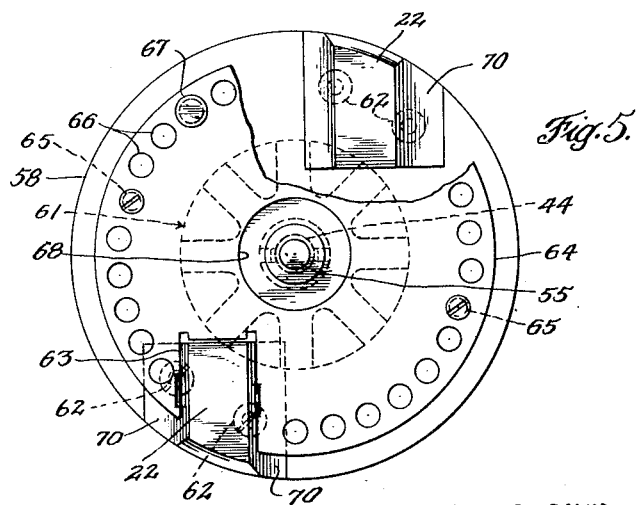
Figure 5 is a top plan view of the rotor unit of Figure 4 with a portion of the top plate broken away.

Describing in illustration but not in limitation and referring to the drawings:

The present invention is particularly directed to improvements in magnetic power units which have been adapted for driving a wide variety of household appliances, such as mixers, stirrers, juicers and auxiliary household and kitchen equipment, such as knife sharpeners, and a variety of small tools. In devices of this kind a permanent magnet is turned on a shaft in a position adjacent to and usually immediately below a magnetically susceptible keeper. Depending upon the application, the keeper may be an impeller or stirrer located in a bowl or glass containing the work, or it may be an element which mechanically interconnects with a tool or the like.

For successful operation of devices of this kind there must be a comparatively small air gap between the permanent magnet and the keeper. Accordingly, especially where the forces are considerable and the magnets and keepers of substantial size, the force of attraction between the magnet and the keeper is large and the keeper is pulled toward the permanent magnet by a powerful force throughout the operation. This has led to considerable difficulty at the end of the cycle, since it has been necessary to remove the work from the permanent magnet by pulling the keeper away manually, usually pulling to the side and breaking a few lines of force at a time, allowing the magnet to return by gravity along the threads on the shaft to its remote position. This procedure is in all cases inconvenient and where very strong magnets and large keepers are used, the termination of the cycle becomes most troublesome, especially for a person of limited strength.

In accordance with the present invention the permanent magnet is automatically moved away from the keeper at the end of the cycle. This is preferably accomplished by interthreading the permanent magnet or its rotor and the driving shaft so that the permanent magnet moves axially on the shaft when the shaft starts to turn to bring the permanent magnet adjacent the keeper, and then reversing the shaft at the end of the cycle to move the permanent magnet axially away from the keeper.

The preferred manner of accomplishing the reversal of drive is to employ a reversible motor to drive the shaft and at the end of the cycle to reverse the motor. In this case the current from the motor can conveniently be cut off by a limit switch acting when the permanent magnet is sufficiently retracted from the keeper. This avoids the necessity of separate manual operation of a switch to disconnect the motor from the line.

When a vertical shaft is used and the magnet is retracted downwardly on the threaded shaft at the end of the cycle, there may be a tendency to bind between the threaded shaft and the nut at the end of the downward motion. By employing a limit switch which engages the rotor near the end of its downward travel a cushioning action is exerted by the limit switch which tends to reduce binding. Likewise the upward push of the spring of the limit switch tends to start the rotor upward again more rapidly than would otherwise be the case when the next cycle is started. In order to move axially, the rotor depends on the axial component of the rotational force of the shaft threads. This axial component is desirably increased by imposing a drag on the rotor at a point remote from the axis at the beginning of the cycle. This drag is conveniently applied by the limit switch.

The limit switch spring also to an extent overcomes the pull of gravity downward on the rotor at the beginning of the cycle.

It will be understood of course that the magnet pull between the magnet and the keeper tends also to move the rotor axially at the beginning of the cycle, but as this pull varies inversely as the square of the distance between the magnet and the keeper, it is less important as a factor in moving the rotor axially at the beginning of the cycle than it is when the rotor has begun to move axially and therefore the magnetic pull is greatly increased due to proximity between the magnet and the keeper. The axial component of the rotational force is in any case sufficient to raise the rotor at the beginning of the cycle, and is sufficient to lower the rotor notwithstanding that the magnetic pull is opposing the lowering.

The present subject matter constitutes an improvement of the invention of Jerome L. Murray embodied in U. S. patent application Serial No. 771,176, filed August 29, 1947, for Mixer and Processor for Home Use and the Like.

The magnetic power unit 20 comprises a motor 21 in the base which turns permanent magnet 22 within a non-magnetic casing 23. The casing provides a suitably circular top support for the work, in this case a glass or tumbler 24 containing a liquid to be mixed by a rotatable magnet keeper 25 resting in the bottom of the glass 24. The magnets are of suitable permanent magnet alloy, and the keeper is desirably of soft steel.

The motor is housed within a base housing 26 which is interconnected at 27 with casing 23, as by screws.

The motor is of reversing character, having a field 28 to drive the armature 30 in the forward direction, and a field 31 to drive the armature in the reverse direction. It will be understood however, that reversal can be accomplished with a single field winding by merely reversing the connections to the field.

The armature is supported on a shaft 33 which is vertically disposed and turns in a top bearing 34 and a bottom bearing 35 mounted in the housing. A bracket 36 mounts the field on the housing.

The motor is connected to the circuit and reversed by an electric switch 37 having a control handle located at the front of the bottom housing. On the lower end of the motor shaft 33 is located a fan 38 in a fan recess closed by a bottom plate 40 on the bottom housing.

A condenser for suppression of radio interference is provided at 41.

At the upper end of the shaft 33 a gear 42 is provided which internally meshes with an internal gear 43 at the lower end of rotor shaft 44. The rotor shaft journals at the bottom in bearing 45 at the upper end of the bottom housing and journals at the top in bearing 46 downwardly directed at the top of the casing 23, and suitably united to the casing as by spot welding. The top bearing 46 desirably comprises a metallic shell 47, a bearing body 48, suitably of phenolic plastic, a thrust disc 50 and a bearing sleeve 51. A ball 52 at the upper end of the shaft engages the thrust disc 50.

The rotor shaft 44 is threaded at 53 and interthreads with a surrounding threaded nut 54. A collar 55 on the shaft 44 limits the upper travel of the nut and the rotor. A metallic washer 56 is provided at the lower surface of the collar.

At the lower end the nut 54 is reduced at 57 to receive the rotor base 58 which fits on the lower end of the nut and is preferably freely turnable with respect to it. A fiber washer 60 is suitably interposed between the top of the rotor base and the nut.

The rotational freedom of the rotor with respect to the nut is preferably limited by a slip clutch 61 which forms no part of the present invention, but forms the subject matter of Morrison et al. U. S. patent application Serial No. 118,306, filed September 28, 1949, for Magnetic Power Unit Shock Absorber. It will be understood, of course, that the slip clutch is not essential to the present invention, it being immaterial from the present standpoint whether the magnets are free or rigid with respect to the nut.

The magnets 22 are secured to the rotor base by screws 62 extending through the base into the lower ends of the magnets. At the upper part of the rotor a suitable non-metallic top plate 64 is provided, having recesses 63 which engage around the suitably tapering sides adjoining the pole faces, and secured to the rotor base by studs 65. The plate 64 may conveniently be employed in balancing the rotor. The rotor base is preferably of soft steel to provide an improved magnet return circuit at the end of the rotor remote from the keeper. The parts of the rotor at the end adjacent the keeper are very desirably of non-magnetically susceptible material.

The rotor top is conveniently provided with a number of circumferentially placed openings 66 which receive slugs or eyelets 67 at points required to provide dynamic balance of the rotor.

The rotor top is recessed at 68 to clear the top bearing.

The upper ends of the magnets are tapered at 70 to concentrate the flux. This tapering may assist in clearing the upper bearing.

The threads between the shaft and the nut are free running so that when the motor is driven in the forward direction the rotor will travel up until the nut engages washer 56 against collar 55. When the motor is driven in the reverse direction the rotor travels down and engages circuit cut-off switch 71, compressing compression spring 72 and opening the switch to open the motor circuit.

Figure 6:
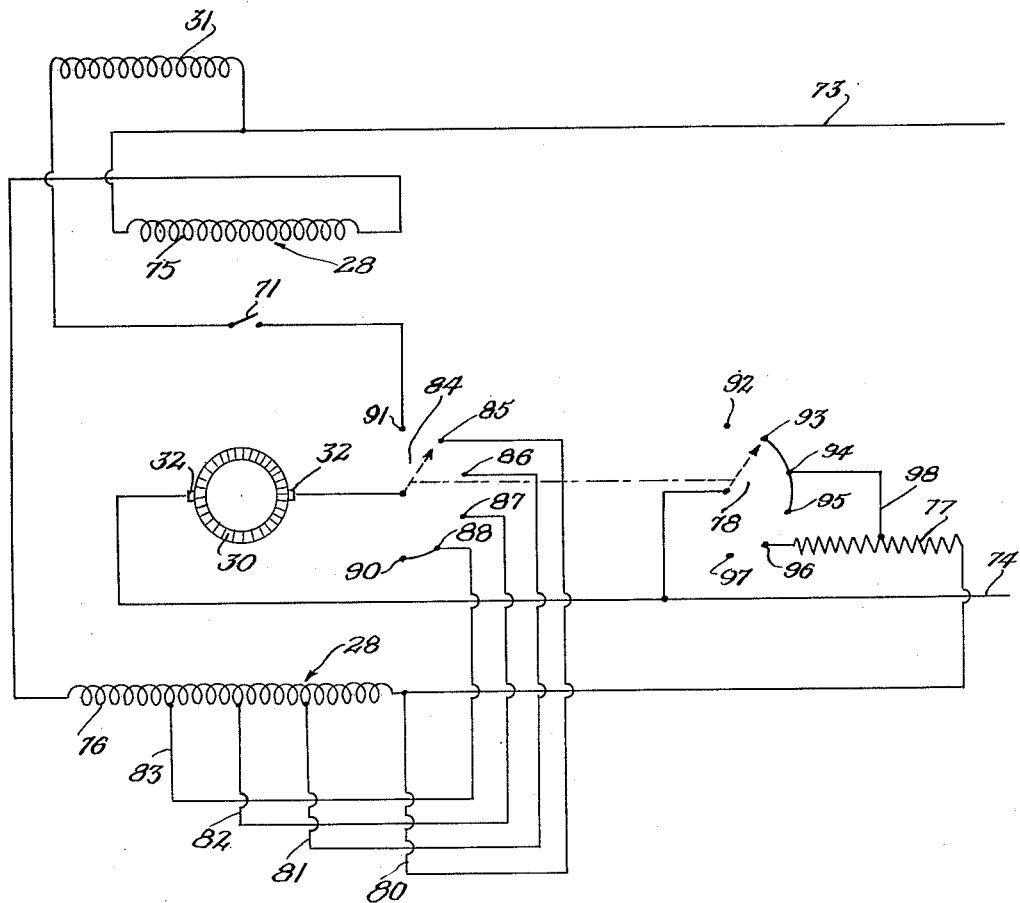
Figure 6 is a circuit diagram.

Referring particularly to Figure 6, the power source is connected to leads 73 and 74. Lead 73 is connected to field coil 75 of forward driving field 28, and then to coil 76 of forward driving field 28. The opposite side of coil 76 is connected to resistor 77, the opposite side of which is connected through resistor switch 78 to the opposite side 74 of the source. Field coil 76 has taps 80, 81, 82 and 83 for speed variation purposes, which are connected through switch 84 to brushes 32 and armature 30 and thence to the opposite side 74 of the source.

Tap 80 from field coil 76 is connected to contact 85 of switch 84, tap 81 is connected to contact 86, tap 82 is connected to contact 87 and tap 83 is connected to contacts 88 and 90. Switch 84 also has an "off" contact 91.

Switch 84 is gang-connected with switch 78. Switch 78 has an "off" position 92 corresponding to the off position of switch 84, has contacts 93, 94 and 95 connected together to a middle tap 96 of resistor 77, these contacts corresponding respectively in positions to contacts 85, 86 and 87, and has contacts 96 and 97 corresponding in position with contacts 88 and 90. When the selector switch is in position 96—97, resistor 77 is completely disconnected.

A reverse drive field 31 is connected at one end with lead 73 and at the other end is connected through normally open circuit cut-off switch 71 with the "off" terminal 91 of switch 84.

In operation it will be evident that when the power unit is inactive and the motor is not energized, the rotor will be in its lowermost position. When the power unit is energized the electric switch is closed to energize the motor to drive the shaft in a direction which causes the rotor to move upward due to the axial component of the force of the threads in the particular direction in which the threads are cut. The rotor moves upward to its limiting position and in such limiting position adjacent to the keeper causes the keeper to turn by magnetic force as in the prior art.

In the prior art, after an operation has been completed and the current disconnected from the motor, if the magnetic pull is strong, the keeper must be pulled away manually before the magnet will return to its remote position. In the present invention on the other hand when the cycle is completed the operator turns the switch to a position in which the motor is reversed, in which position the shaft changes its direction of rotation and the threads force the rotor to its limiting downward position against the action of the magnetic pull between the magnet and the keeper. As the rotor reaches its lower limiting position the limit switch is opened disconnecting the motor. As the same time the limit switch spring is compressed tending to absorb some of the energy of downward motion so that there will be less tendency to bind between the threaded shaft and the nut on starting up the device. The limit switch spring also exerts an upward force which opposes the pull of gravity on the rotor and at the same time exerts a drag on the rotor at a point remote from the axis which tends to increase the axial component of the rotational force, thus urging the rotor more rapidly in its axial movement.

In the circuit shown in Figure 6, at the start of the cycle the rotor is in its lowermost position and circuit cut-off switch 71 is open. When gang switches 84 and 78 are turned to a position to start, contacting contacts 85 and 93, current therefore cannot flow through the reverse driving field 31. Current flows from lead 73 through forward field coil 75 and through the entire length of forward field coil 76, then through the armature 30 of the motor and to lead 74 connected with the opposite side of the source. About half the length of resistor 77 is in shunt with the armature 30 of the motor. The speed is a minimum at this position. As the gang switches are moved away from the off position and make contact with contacts 86, 94 and 87, 95, the shunt through resistor 77 remains the same but the successive taps reduce the number of turns in the field coil, and the motor speeds up. When the switches reach contacts 88 and 96 the number of turns in the field coil is further reduced and the resistance of the shunt is increased, causing the motor to increase speed again. When the switches reach final contacts 90 and 97 the shunt is completely disconnected providing maximum motor speed.

During all of this operation, as soon as the motor has started, the magnet rotor moves to its upper position and cut-off switch 71 closes. When therefore the user desires to shut off the motor, gang switches 84 and 78 are moved to the off position, de-energizing the forward driving field 28. At the same time the reverse driving field is energized in series with the armature to cause the motor to reverse. The magnet rotor, when it moves to its lower position, opens cut-off switch 71, thus completing the cycle. The motor is now de-energized until gang switches 84 and 78 are again moved away from the "off" position.

While reference has been made herein to a permanent magnet or magnets supported on a rotor for creating the turning magnetic field, questions of whether the magnetic driving field is created by a permanent magnet, an electromagnet or some combination of the same, or by magnets on a rotor or a magnet which forms the entire rotor are not critical in the present invention, and it will be understood that variations in these features may be employed if desired.

In view of our invention and disclosure variations and modifications to meet indiivdual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a magnetic power unit, a permanent magnet, a shaft turnably supporting the permanent magnet, threaded interconnections between the shaft and the permanent magnet adapted to move the permanent magnet axially of the shaft as well as to turn the magnet when the shaft turns, means to turn the shaft in one direction, turn the permanent magnet in the same direction, and move the permanent magnet axially in the one direction and a reverse drive for the shaft to move the permanent magnet axially in the opposite direction.

2. In a magnetic power unit, a freely turnable permanent magnet, a shaft turnably supporting the permanent magnet, threaded interconnections between the permanent magnet and the shaft adapted to move the permanent magnet axially as well as to turn the magnet when the shaft turns, a reversing motor on the shaft, and a motor circuit including electric switch contacts for turning on the motor to drive the shaft in one direction, electric switch contacts for reversing the motor and a limit switch operated in response to axial movement of the magnet for turning off the motor.

3. In a magnetic power unit, a permanent magnet, a rotor turnably supporting the permanent magnet, a shaft turnably supporting the rotor, free threaded interconnections between the shaft and the rotor, a casing, and a drag element on the casing applied to the rotor at one end of its axial travel and at a position removed radially from the axis.

4. In a magnetic power unit, a freely turnable rotor including a permanent magnet, a vertical shaft turnably supporting the rotor, threaded interconnections between the rotor and the shaft adapted to move the rotor axially as well as turn the rotor when the shaft turns, a reversible motor connected to the shaft below the rotor and a spring directed upwardly and engaging the rotor in one limit of axial movement and free from engagement at the other limit of axial movement.

5. In a magnetic power unit, a freely turnable permanent magnet, a shaft turnably supporting the permanent magnet, threaded connections between the shaft and the permanent magnet adapted to move the permanent magnet axially of the shaft as well as to turn the magnet when the shaft turns, means to turn the shaft one direction, to turn the permanent magnet in the same direction and move the permanent magnet axially in one direction, a reverse drive for the shaft to move the permanent magnet axially in the opposite direction and a drag element applied to the rotor on movement in the opposite axial direction and engaging the rotor at a position removed radially from the axis.

6. In a magnetic power unit, a freely turnable permanent magnet, a shaft turnably supporting the permanent magnet, threaded interconnections between the permanent magnet and the shaft adapted to move the permanent magnet axially as well as to turn the magnet when the shaft turns, a reversing motor on the shaft, a motor circuit including electric switch contacts for turning on the motor to drive the shaft in one direction, electric switch contacts for reversing the motor, a limit switch operated in response to axial movement of the magnet for turning off the motor, and a drag element applied to the rotor at the end of its axial travel under reverse motion of the motor and engaging the rotor at a position removed radially from the axis.

7. In a magnetic power unit, a freely turnable rotor including a permanent magnet, a vertical shaft turnably supporting the rotor, threaded interconnections between the rotor and the shaft adapted to move the rotor axially as well as to turn the rotor when the shaft turns, a reversing motor connected to the shaft below the rotor, and a spring drag element directed upwardly and engaging the rotor in one limit of axial movement at a position radially removed from the axis and free from engagement with the rotor at the other limit of axial movement.

8. In a magnetic power unit, a freely turnable rotor, a permanent magnet supported on the rotor, a nut secured to the rotor and located at the axis on which the rotor turns, a threaded shaft extending through the nut, interthreading loosely with the nut and supporting the nut, the rotor and the permanent magnet in position freely axially movable on the shaft, a drive directly connected to the shaft and turning the same in one direction and a reverse drive directly connected to the shaft and turning the same in the opposite direction, the drives moving the nut in opposite directions on the shaft.

9. In a magnetic power unit, a freely turnable magnet, a shaft through the axis of turning of the magnet rotatably supporting the magnet, threaded interconnections between the shaft and the magnet permitting the magnet to move freely axially as the shaft turns, and a reversing electric motor directly operatively connected to the shaft and by its operation in reverse directions moving the magnet axially back and forth on the shaft.

10. In a magnetic power unit, a permanent magnet adapted to operate on a keeper, a motor rotatably supporting the permanent magnet, first switch means for turning the motor on and off and means including second switch means operated when the first switch means is moved to turn the motor off for moving the permanent magnet against the magnetic pull between the magnet and the keeper by external energy to a position remote from the keeper.

WILLARD L. MORRISON, Jr.
JAMES DAVID COLE.

REFERENCES CITED

The following references are of record in the file of this patent:

UNITED STATES PATENTS

| Number | Name | Date |
|---|---|---|
| 859,369 | Collins | July 9, 1907 |
| 1,903,832 | Nichols | Apr. 18, 1933 |

FOREIGN PATENTS

| Number | Country | Date |
|---|---|---|
| 354,040 | Great Britain | Aug. 6, 1931 |
| 552,485 | Great Britain | Apr. 9, 1943 |